US011221657B2

(12) United States Patent
Shimamura et al.

(10) Patent No.: US 11,221,657 B2
(45) Date of Patent: Jan. 11, 2022

(54) INFORMATION PROCESSING APPARATUS, METHOD OF CONTROLLING INFORMATION PROCESSING APPARATUS, AND STORAGE MEDIUM STORING PROGRAM

(71) Applicant: BROTHER KOGYO KABUSHIKI KAISHA, Nagoya (JP)

(72) Inventors: Yasuhiro Shimamura, Nagoya (JP); Hajime Usami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 202 days.

(21) Appl. No.: 16/728,411

(22) Filed: Dec. 27, 2019

(65) Prior Publication Data

US 2020/0209933 A1 Jul. 2, 2020

(30) Foreign Application Priority Data

Dec. 28, 2018 (JP) .............................. JP2018-246984

(51) Int. Cl.
*G06F 1/26* (2006.01)
*G06F 3/12* (2006.01)

(52) U.S. Cl.
CPC ............ *G06F 1/266* (2013.01); *G06F 3/1205* (2013.01); *G06F 3/1231* (2013.01); *G06F 3/1273* (2013.01)

(58) Field of Classification Search
None
See application file for complete search history.

(56) References Cited

U.S. PATENT DOCUMENTS

2015/0293514 A1* 10/2015 Tupala .............. G01R 19/16595
700/295
2018/0284865 A1* 10/2018 Shimamura ........... G06F 3/1279

FOREIGN PATENT DOCUMENTS

JP 2015-I 74374 A 10/2015
JP 2015-I 74375 A 10/2015

* cited by examiner

*Primary Examiner* — Paul Yen
(74) *Attorney, Agent, or Firm* — Merchant & Gould P.C.

(57) ABSTRACT

A first interface performs power delivery and communication with a first external apparatus. A second interface performs power delivery and communication with a second external apparatus. A controller is configured to perform: storing, in a memory, history information relating to power delivery performed with the second external apparatus through the second interface, the history information including identification information of the second external apparatus and an amount of power delivery with the second external apparatus; determining whether to perform a power role switch with the first external apparatus, the power role switch being a switch of a power role between a power source of supplying power and a power sink of receiving power; and in response to determining that the power role switch is to be performed, performing power delivery with the second external apparatus through the second interface based on the history information stored in the memory.

20 Claims, 10 Drawing Sheets

FIG. 5

HISTORY INFORMATION

| VENDOR ID | PRODUCT ID | DATE AND TIME OF START OF POWER SUPPLY | DATE AND TIME OF REDUCTION OF AMOUNT OF SUPPLIED POWER | CURRENT AMOUNT OF SUPPLIED POWER | AMOUNT OF SUPPLIED POWER BEFORE REDUCTION | USB PORT |
|---|---|---|---|---|---|---|
| 0001 | 0x0A17 | 2018/11/8 18:00 | 2018/11/9 12:00 | 5W | 10W | RECEPTACLE 51A |
| 0003 | 0x0882 | 2018/11/9 12:00 | | 20W | | RECEPTACLE 51B |

. . . .

INFORMATION PROCESSING APPARATUS, METHOD OF CONTROLLING INFORMATION PROCESSING APPARATUS, AND STORAGE MEDIUM STORING PROGRAM

CROSS REFERENCE TO RELATED APPLICATIONS

This application claims priority from Japanese Patent Application No. 2018-246984 filed Dec. 28, 2018. The entire content of the priority application is incorporated herein by reference.

TECHNICAL FIELD

This disclosure relates to an information processing apparatus that performs power delivery through a communication interface, a method of controlling an information processing apparatus, and a storage medium storing a program.

BACKGROUND

There is a conventional image forming apparatus that performs power delivery with an external apparatus by a method compatible with a USB PD (USB Power Delivery) standard, for example. A known image forming apparatus acquires information on the remaining amount of a battery from an external apparatus connected to a USB interface, when performing a print job. The image forming apparatus switches the direction of power delivery based on the acquired information on the remaining amount of the battery.

SUMMARY

According to one aspect, this specification discloses an information processing apparatus. The information processing apparatus includes a first interface, a second interface, and a controller. The first interface is configured to perform power delivery and communication with a first external apparatus. The second interface is configured to perform power delivery and communication with a second external apparatus. The controller is configured to perform: storing, in a memory, history information relating to power delivery performed with the second external apparatus through the second interface, the history information including identification information of the second external apparatus and an amount of power delivery with the second external apparatus; determining whether to perform a power role switch with the first external apparatus, the power role switch being a switch of a power role between a power source of supplying power and a power sink of receiving power; and in response to determining that the power role switch is to be performed, performing power delivery with the second external apparatus through the second interface based on the history information stored in the memory.

According to another aspect, this specification also discloses a method of controlling an information processing apparatus including a first interface configured to perform power delivery and communication with a first external apparatus and a second interface configured to perform power delivery and communication with a second external apparatus. The method comprising: storing, in a memory, history information relating to power delivery performed with the second external apparatus through the second interface, the history information including identification information of the second external apparatus and an amount of power delivery with the second external apparatus; determining whether to perform a power role switch with the first external apparatus, the power role switch being a switch of a power role between a power source of supplying power and a power sink of receiving power; and in response to determining that the power role switch is to be performed, performing power delivery with the second external apparatus through the second interface based on the history information stored in the memory.

According to still another aspect, this specification also discloses a non-transitory computer-readable storage medium storing a set of program instructions for controlling an information processing apparatus including a controller, a first interface configured to perform power delivery and communication with a first external apparatus, and a second interface configured to perform power delivery and communication with a second external apparatus. The set of program instructions, when executed by the controller, causes the information processing apparatus to perform: storing, in a memory, history information relating to power delivery performed with the second external apparatus through the second interface, the history information including identification information of the second external apparatus and an amount of power delivery with the second external apparatus; determining whether to perform a power role switch with the first external apparatus, the power role switch being a switch of a power role between a power source of supplying power and a power sink of receiving power; and in response to determining that the power role switch is to be performed, performing power delivery with the second external apparatus through the second interface based on the history information stored in the memory.

The contents disclosed in this specification may be implemented as an image processing apparatus as well as a control method of controlling an image processing apparatus and a program executable on a computer that controls an image processing apparatus.

BRIEF DESCRIPTION OF THE DRAWINGS

Embodiments in accordance with this disclosure will be described in detail with reference to the following figures wherein:

FIG. 5 is a table showing the contents of history information;

DETAILED DESCRIPTION

When the direction of power delivery is switched, switch of power role with the external apparatus is performed. The power role refers to one of a power source that is the power role of supplying power (electric power) and a power sink that is the power role of receiving power, for example. If the power role is switched between the apparatus itself and the external apparatus, the amount of power delivery between the apparatus itself and the external apparatus changes. As a result, in a case where another external apparatus is connected to the apparatus itself, there is a possibility that power delivery cannot be performed appropriately between the apparatus itself and the other external apparatus.

In view of the foregoing, an aspect of an object of this disclosure is to provide an information processing apparatus configured to appropriately perform power delivery after power role switch, a method of controlling an information processing apparatus, and a storage medium storing a program.

Some aspects of this disclosure will be described while referring to the attached drawings.

Hereinafter, a portable printer 1 according to one embodiment embodying an information processing apparatus of this disclosure will be described while referring to FIG. 1.

<1. Configuration of Portable Printer>

Figure 1:
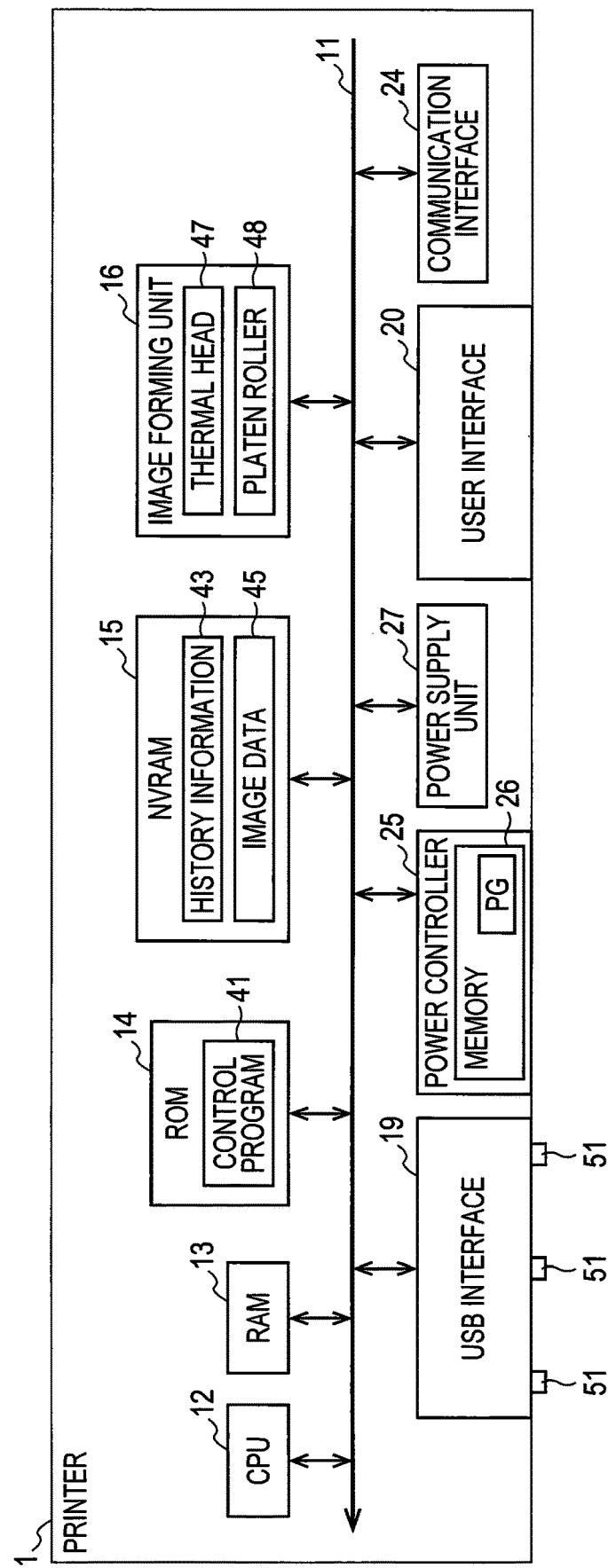
FIG. 1 is a block diagram of a printer according to an embodiment.

FIG. 1 shows the electrical configuration of the portable printer 1 of the present embodiment. For example, the printer 1 is a portable printing apparatus that can be carried, and prints image data of a print job received from a PC, a smart phone, and so on through wired communication or wireless communication on a particular sheet (thermal paper and so on). The printer 1 includes a CPU 12, a RAM 13, a ROM 14, an NVRAM 15, an image forming unit 16, a USB interface 19, a user interface 20, a communication interface 24, a power controller 25, a power supply unit 27, and so on. These components such as the CPU 12 are connected to each other through a bus 11.

For example, the ROM 14 is a non-volatile memory such as a flash memory, and stores various programs such as a control program 41. For example, the CPU 12 executes the control program 41 read out from the ROM 14 and starts up the system of the printer 1. The NVRAM 15 is a non-volatile memory. The NVRAM 15 stores history information 43 and image data 45. The above-mentioned storage place of data is just an example. For example, the control program 41 may be stored in the NVRAM 15. The history information 43 may be stored in the ROM 14. The memory that stores the control program 41 is not limited to a ROM, but may be a flash memory and so on. The memory that stores the control program 41 may be a computer-readable storage medium. As the computer-readable storage medium, a storage medium such as a CD-ROM and a DVD-ROM may be adopted in addition to the above example.

For example, the control program 41 is a firmware that performs overall control of each unit of the printer 1. The CPU 12 executes the control program 41 and controls each unit connected through the bus 11 while temporarily storing the processing results in the RAM 13. As will be described later, the history information 43 is information indicative of the history of power delivery by connection of the USB PD (USB Power Delivery) standard. For example, the image data 45 is image data of a print job that is received from a PC, a smart phone, and so on through wired communication or wireless communication.

For example, the image forming unit 16 includes a line-type (linear-type) thermal head 47, and prints an image on a sheet by a direct thermal method based on control by the CPU 12. The image forming unit 16 conveys a sheet by rotating a platen roller 48 provided to face the thermal head 47. For example, when a sheet is inserted in an insertion opening of the printer 1 at the start of printing, the inserted sheet is guided to a part at which the platen roller 48 and the thermal head 47 face each other, and is discharged from a discharge opening after printing is finished.

For example, the USB interface 19 is an interface that performs communication and power delivery compatible with the USB PD standard. For example, the USB interface 19 includes three receptacles 51 (USB ports 51) as connectors. The USB interface 19 performs data communication and power delivery with various external apparatuses connected to the receptacles 51. As the connectable external apparatuses, for example, various apparatuses that can be connected by the USB standard may be adopted, such as a smart phone, a personal computer, an external hard disk drive, a USB memory, and a card reader.

For example, the receptacle 51 is a connector that is compatible with the USB Type-C standard. Each receptacle 51 includes a plurality of pins for performing communication and power delivery. As the plurality of pins, for example, the receptacle 51 includes a TX pin, an RX pin, a D pin, a Vbus, a CC pin, and so on, in the connector of the USB Type-C standard. For example, the receptacle 51 performs communication by using any of the TX pin, the RX pin, and the D pin. The receptacle 51 supplies and receives power by using the Vbus pin.

For example, the CC pin is a pin used for determining the power role, and includes a CC1 pin and a CC2 pin for two sides of a plug connected to the receptacle 51. Each receptacle 51 has a dual role power (DRP) function of switching between a power source that is the power role of supplying power and a power sink that is the power role of receiving power.

Figure 2:
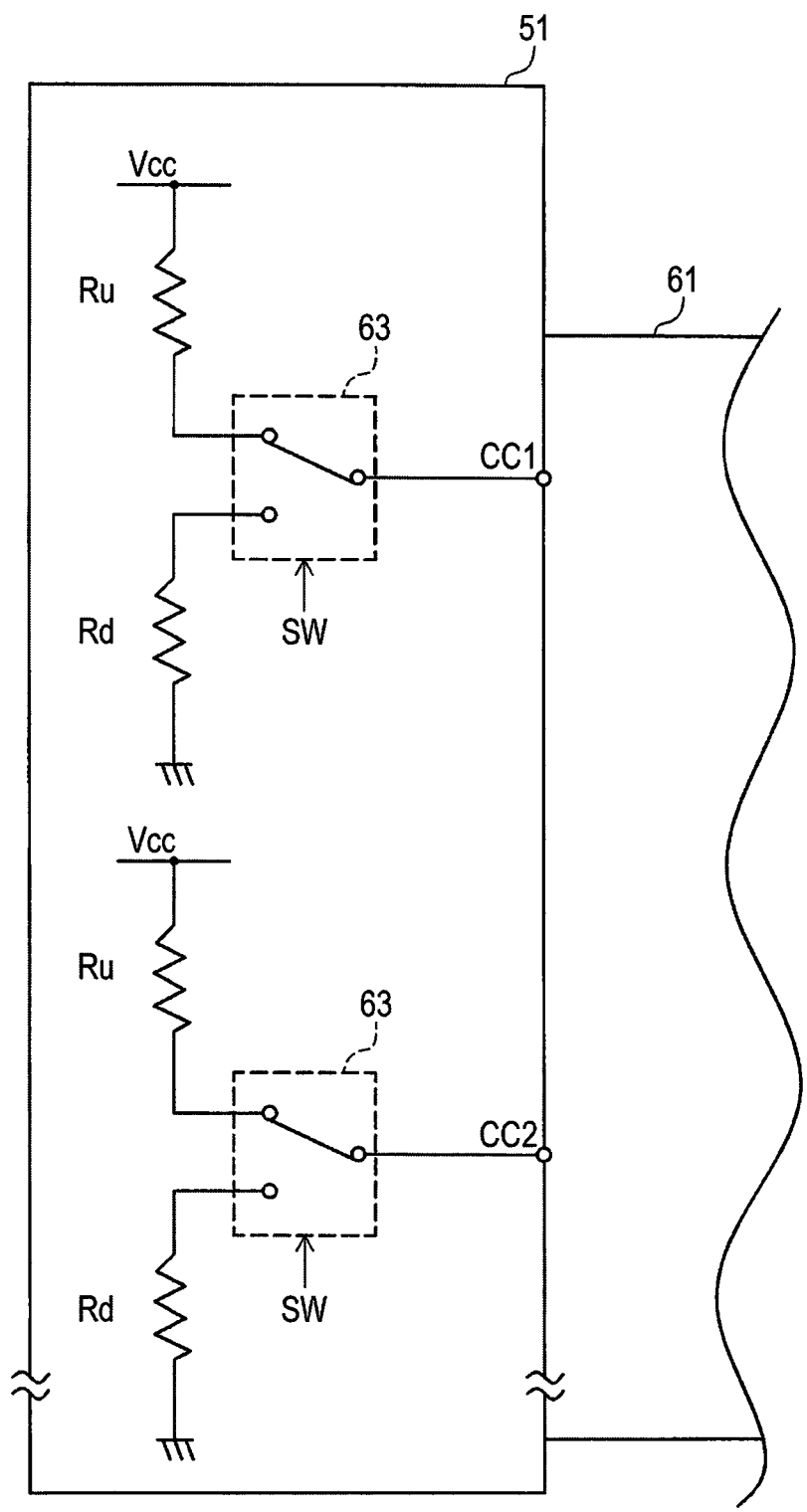
FIG. 2 is a diagram showing the connection configuration of CC pins.

The power controller 25 controls power delivery and transmission and reception of data through the USB interface 19. The power controller 25 determines the power role based on the connection state of the CC pin when an external apparatus is connected to each receptacle 51, and performs negotiation of power delivery. For example, the negotiation here is processing of setting the power source or the power sink, setting the amount of power that is supplied and received, and so on. Specifically, FIG. 2 shows a part of the receptacle 51 that relates to the CC pins. The CC1 pin and the CC2 pin have the same configuration. Depending on the side of a plug 61 of a USB cable connected to the receptacle 51, one of the CC1 pin and the CC2 pin is used as a configuration channel (CC) and the other is used for transmitting VCONN. Thus, in the following descriptions, the CC1 pin and the CC2 pin are collectively referred to as "CC pin".

As shown in FIG. 2, the receptacle 51 includes a pull-up resistor Ru and a pull-down resistor Rd. One terminal of the pull-up resistor Ru is connected to a power supply Vcc. The power supply Vcc supplies a particular voltage (for example, 5V). The other terminal of the pull-up resistor Ru is connectable to the CC pin through a switch 63. One terminal of the pull-down resistor Rd is connected to ground. The other terminal of the pull-down resistor Rd is connectable to the CC pin through the switch 63.

The switch 63 switches connection based on a switching signal SW supplied from a switch controller (not shown). The switch 63 switches between a state where the CC pin and the pull-up resistor Ru are connected (a pull-up state) and a state where the CC pin and the pull-down resistor Rd are connected (a pull-down state). For example, when an external apparatus is connected to the receptacle 51 and it is detected that the potential of the CC pin (one of CC1 and CC2 that functions as CC) is a potential of the pull-up state, the power controller 25 causes the receptacle 51 to function as the power source. The power controller 25 performs negotiation of setting of the amount of power to be supplied and so on, for supplying power through the Vbus pin of the receptacle 51. Similarly, when an external apparatus is connected to the receptacle 51 and it is detected that the potential of the CC pin is a potential of the pull-down state, the power controller 25 causes the receptacle 51 to function as the power sink. The power controller 25 performs negotiation for receiving power through the receptacle 51.

As described above, the receptacle 51 cyclically switches the switch 63, so that each receptacle 51 can function as either of power host (power source) and power sink. The power controller 25 determines the power role based on the potential of the CC pin at the time of connection. Hence, in the printer 1 of the present embodiment, in an initial state where an external apparatus is connected, the power role of each receptacle 51 is determined randomly.

As shown in FIG. 1, the power controller 25 includes a memory 26. The memory 26 stores a program PG. The power controller 25 includes a processing circuit such as a CPU, and executes the program PG by the processing circuit to perform controls of the power supply unit 27 and so on. For example, a RAM, a ROM, a flash memory, and so on are combined to form the memory 26.

The power supply unit 27 functions as the power supply of each device in the printer 1, and supplies power (electric power) to each device. The power supply unit 27 generates power that is supplied through the USB interface 19. The power supply unit 27 charges a battery 75 (see FIG. 4) with power received through the USB interface 19. The detailed configuration of the power supply unit 27 will be described later.

The user interface 20 is a touch panel, for example, and includes an LCD panel, a light source such as LED that emits light from the back side of the LCD panel, a contact sensing film affixed to the front surface of the LCD panel, and so on. The user interface 20 receives an operation to the printer 1, and outputs a signal depending on the operation input to the CPU 12. The user interface 20 also displays information relating to the printer 1. The user interface 20 changes the display content of the LCD panel based on control by the CPU 12.

The communication interface 24 is configured to perform wired communication and wireless communication. The printer 1 receives printing by the communication interface 24 through wired LAN or wireless communication. The CPU 12 controls the communication interface 24, and receives a print job (the image data 45 and so on) through wired communication or wireless communication. The printer 1 receives a print job by communication of the USB interface 19. The CPU 12 controls the image forming unit 16 to perform printing based on the received print job.

<2. Configuration of Power Supply Unit 27>

Figure 3:
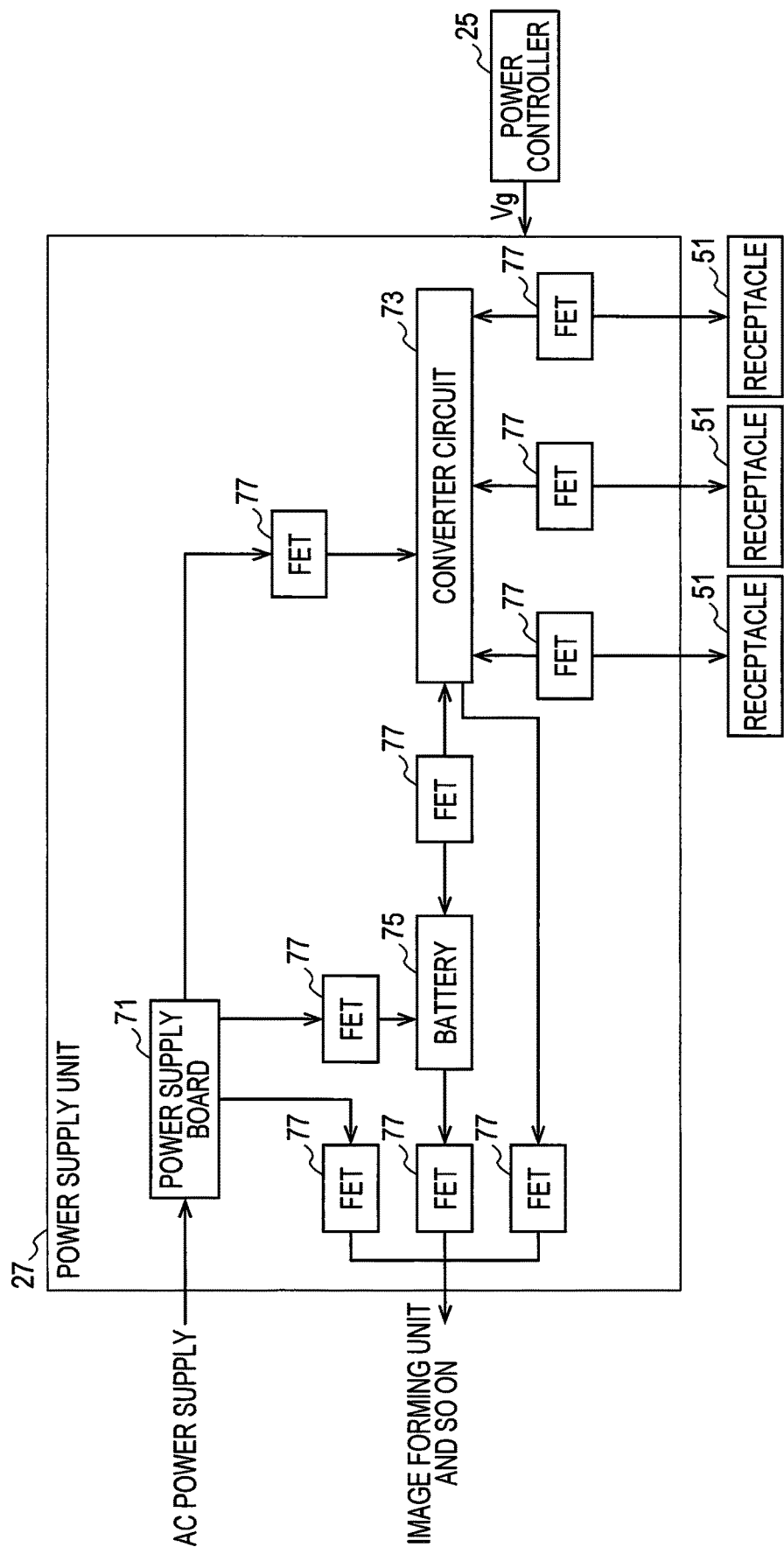
FIG. 3 is a block diagram showing the circuit configuration relating power delivery of the printer.

Next, the configuration of the power supply unit 27 will be described while referring to FIG. 3. As shown in FIG. 3, the power supply unit 27 includes a power supply board 71, a converter circuit 73, the battery 75, and so on. The power supply unit 27 also includes FETs 77 configured to switch mutual connection of the power supply board 71 and so on, and to switch connection between the receptacles 51 and the power supply board 71 and so on. The FET 77 is a field effect transistor that switches connection depending on a gate voltage Vg supplied from the power controller 25. Here, the switch for switching connection is not limited to an FET, but may be an IGBT. Further, the switch for switching connection is not limited to a semiconductor switch, buy may be a relay and so on.

The power supply board 71 includes a power supply cord and a power supply circuit (a bridge diode, a smoothing circuit, and so on), and converts an AC voltage supplied from an AC power supply into a DC voltage. The power supply board 71 is connected to each of the converter circuit 73 and the battery 75 through the FET 77. The converter circuit 73 is a DC/DC converter, for example, and transforms the inputted DC voltage to generate DC voltages having different voltage values. The converter circuit 73 is connected to each of the battery 75 and the three receptacles 51 through the FET 77. For example, based on control by the CPU 12, the converter circuit 73 changes the amount of supplied power that is supplied from each receptacle 51.

The battery 75 is configured to be charged with power supplied from the power supply board 71 and the converter circuit 73. Each of the power supply board 71, the converter circuit 73, and the battery 75 is connected to each device of the printer 1 (the image forming unit 16 and so on) through the FET 77. Hence, the printer 1 of the present embodiment is configured to be driven by using power received from the AC power supply through the power supply board 71. The printer 1 is also configured to be driven by using power supplied from the battery 75, and can be carried to various places for use. The printer 1 is further configured to transform power received through the USB interface 19 (the receptacle 51) by using the converter circuit 73, and to supply the power to the image forming unit 16 and so on.

For example, the power controller 25 is configured to, by outputting the gate voltage Vg to switch ON and OFF of the FET 77 based on control by the CPU 12, change the device that supplies power to each unit of the printer 1 between the power supply board 71 and the converter circuit 73. The power controller 25 is configured to, by switching the FET 77, change the device that supplies charging power to the battery 75 between the power supply board 71 and the converter circuit 73. The receptacle 51 that functions as a power source supplies power to the external apparatus. The power controller 25 is configured to, by switching the FET 77, change the device that supplies power to the external apparatus through the receptacle 51 that functions as the power source, among the power supply board 71, the battery 75, and another external apparatus. The device that controls the FET 77 is not limited to the power controller 25, but may be the CPU 12.

<3. Power Supply Control>

Next, power delivery control of the USB interface 19 by the printer 1 of the present embodiment will be described while referring to FIG. 4. When the power of the printer 1 is turned on, for example, the CPU 12 executes the control program 41 stored in the ROM 14 to start up the system of the printer 1, and then starts power control shown in FIG. 4. In the following description, the CPU 12 that executes the control program 41 may be simply referred to as "the CPU 12". For example, the phrase "the CPU 12" may mean "the CPU 12 that executes the control program 41". A flowchart in this specification basically indicates processing by the CPU 12 in accordance with instructions described in a program. That is, processing such as "determine" and "store" in the following description indicates processing by the CPU 12. The processing by the CPU 12 also includes hardware control. The power control shown in FIG. 4 may be performed by a device other than the CPU 12. For example, the power control shown in FIG. 4 may be performed by executing a program PG by the power controller 25.

First, in Step 11 (hereinafter, step is simply referred to as "S") of FIG. 4, the CPU 12 of the printer 1 checks a connection state of the USB interface 19. For example, upon detecting a new connection to the USB interface 19, the CPU 12 controls the power controller 25 to perform negotiation with an external apparatus. Note that, when the system starts up, the CPU 12 may detect, as a new connection, an external apparatus that has been already connected at the startup of the printer 1, and may update the history information 43 in S13 described later. The CPU 12 starts power delivery with the external apparatus.

In S13, for example, when a new external apparatus is connected to the receptacle 51, the CPU 12 requests the newly-connected external apparatus to provide device information by a plug-and-play (PnP) function. The device information here is information such as a vendor ID of the manufacturer of the external apparatus, a product ID, and a USB device class ID, for example. The vendor ID and the product ID may be used as identification information for identifying the external apparatus, and are stored as the history information 43 (see FIG. 5). The CPU 12 may acquire, as the device information, information of whether the external apparatus includes a battery and so on. After acquiring the device information, the CPU 12 controls the power controller 25 to perform negotiation with the external apparatus. The power controller 25 performs setting of the power role (power source or power sink) and determines the amount of power delivery that is supplied to and received from the external apparatus.

Next, the CPU 12 stores, as the history information 43, information on the external apparatus for which new connection is detected in S11 (S13). For example, the CPU 12 of the present embodiment stores, as the history information 43, information on the external apparatus that functions as power sink, among the external apparatuses for which connection is detected and power delivery is performed. In other words, even when new connection is detected, the CPU 12 does not store an external apparatus of power source as the history information 43, and only stores an external apparatus of power sink as the history information 43. The contents of the history information 43 will be described later.

Next, in S15, the CPU 12 determines whether a swap request of the power role is received from the external apparatus of the power source. The swap request of the power role here is a request for switching the power role between the power source and the power sink mutually. The swap request of the power role may be transmitted and received by a method compatible with Power Role Swap or Fast Power Role Swap prescribed by the USB PD standard, for example.

In S15, the CPU 12 determines whether a swap request for change to power sink is received from the external apparatus of power source, among the external apparatuses that are currently connected. In response to determining in S15 that no swap request is received (S15: NO), the CPU 12 again executes the processing from S11. Thus, until a swap request is received from the external apparatus of power source (S15: NO), the CPU 12 executes S11 to check the connection state and in S13 updates the history information 43 based on the checked result. Upon detecting connection of a new external apparatus in S11, the CPU 12 performs negotiation with the external apparatus. In a case where power is supplied to that external apparatus, that is, power is supplied to the external apparatus of power sink, the CPU 12 updates the history information 43 in S13. Further, in a case where the CPU 12 controls the power controller 25 and the converter circuit 73 (see FIG. 3) to change the amount of supplied power supplied to the external apparatus of power sink, in S13 the CPU 12 stores, as the history information 43, the amount of supplied power before and after the change.

The CPU 12 may delete information on an external apparatus from the history information 43. For example, when an external apparatus of power sink is disconnected from the printer 1 and a certain period of time has elapsed, the CPU 12 may delete the information on the external apparatus from the history information 43. Alternatively, when the external apparatus of the same vendor ID is connected again, the CPU 12 may delete old information on the external apparatus from the history information 43. This suppresses that a plurality of information on the same external apparatus is stored as the history information 43.

FIG. 5 shows an example of the contents of the history information 43. As shown in FIG. 5, the history information 43 includes a vendor ID, a product ID, date and time of start of power supply, date and time of reduction of the amount of supplied power, the current amount of supplied power, the amount of supplied power before reduction, and information on USB port in association with one another. Upon acquiring the vendor ID and the product ID from the external apparatus of power sink in S11, for example, the CPU 12 stores that information as the history information 43 in S13. The CPU 12 stores the date and time when power supply to the external apparatus of power sink is started, as the date and time of start of power supply in the history information 43. The CPU 12 stores the amount of supplied power that is supplied to the external apparatus of power sink, as the current amount of supplied power in the history information 43. The CPU 12 stores the amount of supplied power before reduction in a case where the amount of supplied power that is supplied to the external apparatus is reduced by negotiation, as the history information 43. The CPU 12 stores the amount of supplied power after reduction, as the current amount of supplied power in the history information 43. The USB port is information for identifying the plurality of receptacles 51. The CPU 12 stores, as the history information 43, information for identifying the receptacle 51 to which the external apparatus of power sink is connected, in association with the vendor ID and so on. As shown in the column of the USB port in FIG. 5, for example, the CPU 12 uses receptacles 51A, 51B, and 51C as identification information of the receptacles 51 provided at the printer 1. In the following description, when the three receptacles 51 are distinguished in the description, each of the three receptacles 51 are referred to as receptacle 51A, 51B, and 51C by using the identification information. In some cases, the three receptacles 51 are collectively referred to as the receptacle 51.

Figure 6:
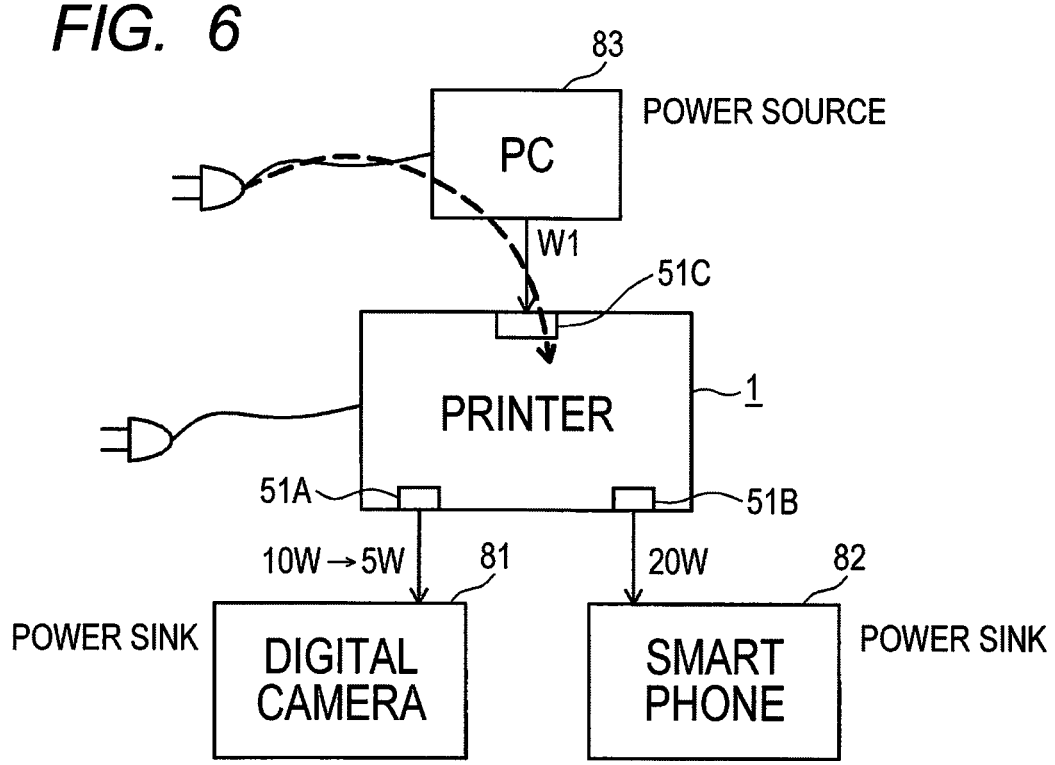
FIG. 6 is a diagram showing the configuration of USB connection of the printer.

FIG. 6 shows the configuration of USB connection in a case where external apparatuses are connected to the printer 1, and shows the connection configuration in accordance with the history information 43 in FIG. 5. As shown in FIG. 6, for example, a digital camera 81 is connected to the receptacle 51A of the printer 1. A smart phone 82 is connected to the receptacle 51B. A PC (personal computer) 83 is connected to the receptacle 51C.

In the example of the history information 43 shown in FIG. 5, first, the external apparatus of the vendor ID "0001" (the digital camera 81) is connected to the receptacle 51A at 18:00 on Nov. 8, 2018. The CPU 12 controls the power controller 25 to cause the receptacle 51A to function as power source, and determines by negotiation that 10 W power is suppled from the receptacle 51A to the digital camera 81. Specifically, the printer 1 transmits a plurality of options for the amount of power (for example, 5 W, 10 W, 15 W, and so on) to the digital camera 81. Then, the digital camera 81 returns a response including a desired amount of power (for example, 10 W) to the printer 1. Then, the printer 1 transmits a response of acceptance to the digital camera 81.

Next, the external apparatus of the vendor ID "0003" (the smart phone 82) is connected to the receptacle 51B at 12:00 on Nov. 9, 2018. The CPU 12 controls the power controller 25 to cause the receptacle 51B to function as power source, and determines by negotiation that 20 W power is suppled from the receptacle 51B to the smart phone 82. In order to secure power, the CPU 12 controls the power controller 25 to perform negotiation to reduce the amount of power supplied to the digital camera 81 (the vendor ID "0001") that is already connected. The power controller 25 notifies the digital camera 81 that the amount of supplied power is reduced, reduces the amount of supplied power from 10 W to 5 W, and supplies 20 W power to the smart phone 82. The CPU 12 acquires the result of negotiation by the power controller 25, and updates the history information 43. In this way, the CPU 12 updates the history information 43 on the digital camera 81 and the smart phone 82 of power sink, as needed.

On the other hand, the PC 83 as the external apparatus of power source is connected to the receptacle 51C. The power controller 25 performs negotiation with the PC 83 and receives power W1 from the PC 83 (see the dashed arrow in FIG. 6). Specifically, the PC 83 transmits a plurality of options for the amount of power to the printer 1. Then, the printer 1 returns a response including a desired amount of power (W1 in this embodiment) to the PC 83. Then, the PC 83 transmits a response of acceptance to the printer 1. The CPU 12 controls the power controller 25 to supply the power W1 received from the PC 83 to the digital camera 81 and the smart phone 82. As shown in FIG. 6, in this state, the printer 1 functions as power sink relative to the PC 83 and functions as power source for the digital camera 81 and the smart phone 82.

Figure 7:
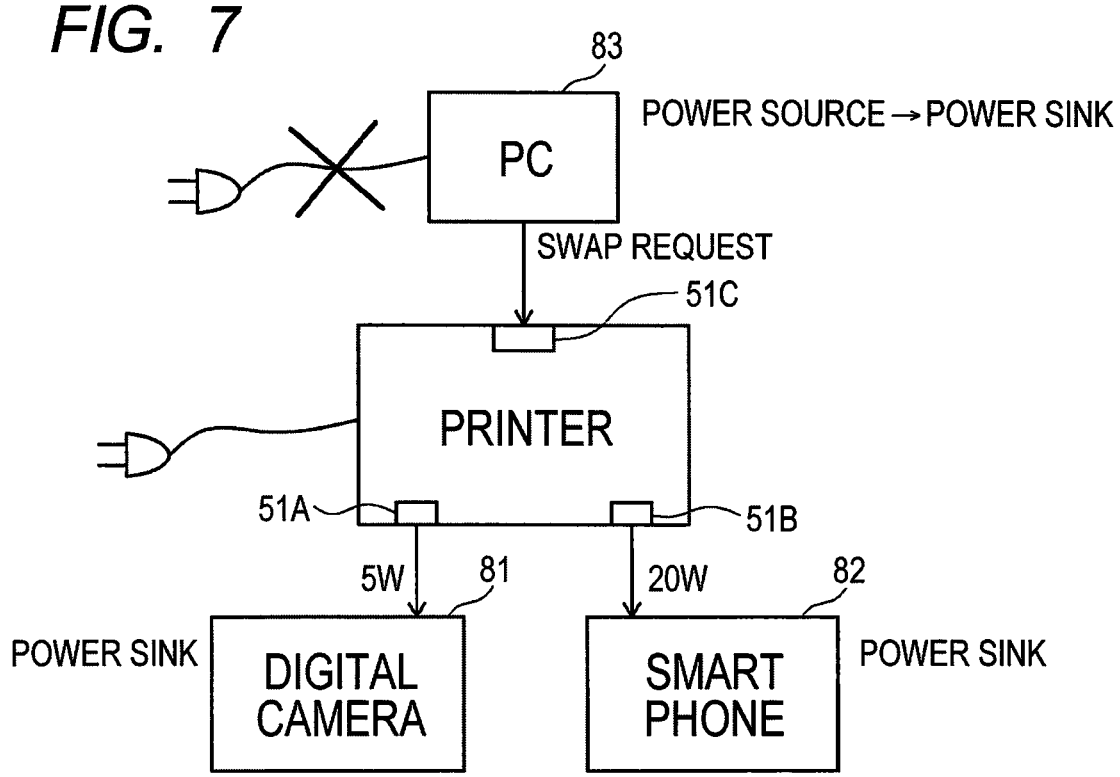
FIG. 7 is a diagram showing the configuration of USB connection of the printer.

Returning to FIG. 4, in response to determining in S15 that a swap request is received from the external apparatus of power source (S15: YES), the CPU 12 executes S17. For example, as shown in FIG. 7, when the PC 83 is disconnected from the AC power supply, the PC 83 transmits a swap request to the printer 1 because power shortage is expected. The printer 1 receives the swap request from the PC 83 of power source through the receptacle 51C.

In S17, the CPU 12 determines whether suppliable power W2 is larger than or equal to supply power W3. The suppliable power W2 is the amount of power that can be supplied from the printer 1 to the external apparatus of power sink, that is, the digital camera 81 and the smart phone 82 in a state where there is no power W1 supplied from the PC 83 of power source, for example. The suppliable power W2 may include the amount of power that is received from the AC power supply through the power supply board 71 (see FIG. 3). The suppliable power W2 may include the amount of power that can be suppled from the battery 75 (see FIG. 3). In a case where there is an external apparatus of power source other than PC 83, the suppliable power W2 may include the amount of power that is received from the external apparatus.

The supply power W3 in S17 is the total value of the amount of power that is supplied from the printer 1 to the digital camera 81 and the smart phone 82 of power sink, for example. In the example shown in FIG. 7, the supply power W3 is 25 W (5 W of the digital camera 81 plus 20 W of the smart phone 82). In this case, the CPU 12 determines in S17 whether, in a case where the PC 83 stops supply of the power W1, the amount of the power W1 can be supplied by using the AC power supply, the battery 75, and so on, instead of the PC 83. In this way, it is determined whether the amount of power supplied to the digital camera 81 and the smart phone 82 of power sink can be maintained.

In response to determining in S17 that the suppliable power W2 is larger than or equal to the supply power W3 (S17: YES), the CPU 12 executes the processing in S19 and thereafter. For example, as shown in FIG. 7, in a case where the printer 1 is connected to the AC power supply, in S17 the CPU 12 determines that the suppliable power W2 is larger than or equal to the supply power W3 because the necessary amount of power W1 can be received from the AC power supply. For example, in a case where the battery 75 has a sufficient remaining amount (that is, the remaining amount of the battery 75 is larger than or equal to a particular level), in S17 the CPU 12 determines that the suppliable power W2 is larger than or equal to the supply power W3 because the necessary amount of power W1 can be received from the battery 75. Further, as described above, in a case where there is an external apparatus of power source other than PC 83, the amount of power that is received from the external apparatus is added to the suppliable power W2. In these cases, because the amount of the power W1 can be supplied from other power supply, the CPU 12 performs control of maintaining the amount of power supplied to the digital camera 81 and the smart phone 82.

In S19, the CPU 12 transmits a response of accepting the swap request to the PC 83 from which the swap request is received. Upon completing negotiation of the swap request between the printer 1 and the PC 83, the PC 83 switches the power role of the receptacle 51C from power source to power sink. The printer 1 switches the power role from power sink to power source. After switching the power role, the CPU 12 having become power source supplies the minimum suppliable amount of power to the PC 83 through the receptacle 51C, for example. The minimum suppliable amount of power is power of 2.5 W (5V and 0.5 A), for example. If there is excess power, the CPU 12 may supply the PC 83 with power that is requested from the PC 83.

In S21, the CPU 12 stops power supply to the digital camera 81 and the smart phone 82 of power sink. For example, the CPU 12 controls the power controller 25 to notify the digital camera 81 and the smart phone 82 about stop of power supply. The power controller 25 notifies the digital camera 81 about stop of power supply and, upon receiving a response of acceptance from the digital camera 81, stops 5 W power supply. The CPU 12 controls the power controller 25, the converter circuit 73, and so on, to supply the minimum suppliable amount of power (2.5 W, 5V, 0.5 A), for example, to the digital camera 81 (S23). The CPU 12 controls the smart phone 82 in a similar manner to the digital camera 81, and supplies the minimum suppliable amount of power (2.5 W) to the smart phone 82 (S23).

Figure 8:
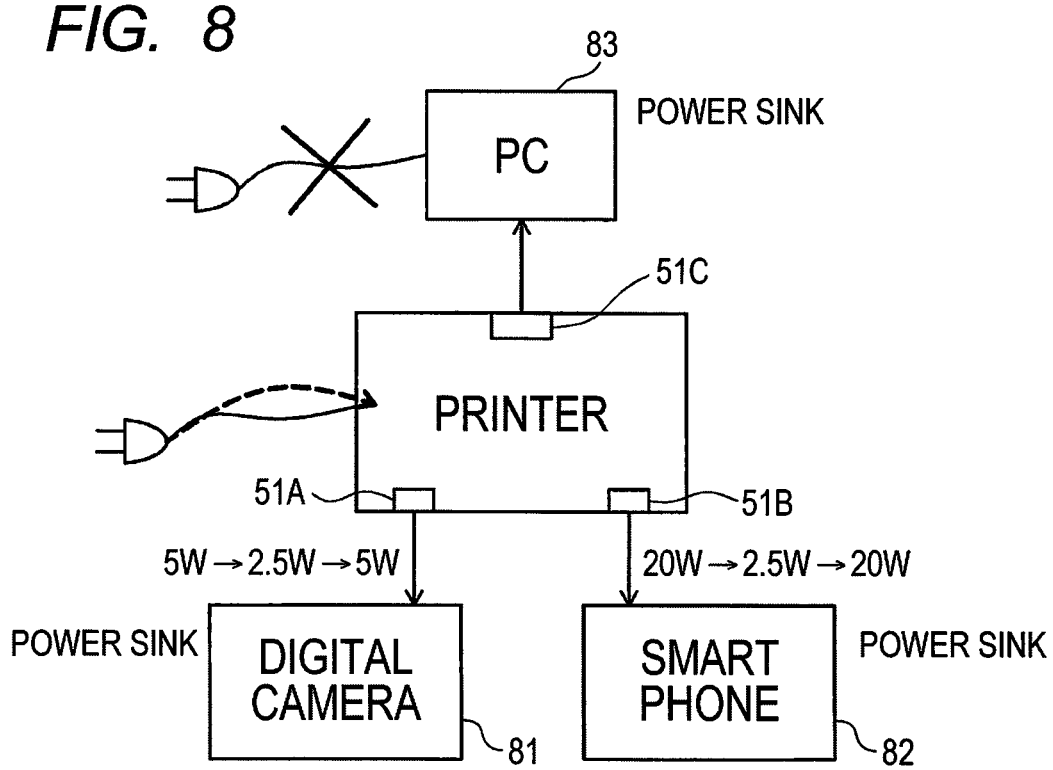
FIG. 8 is a diagram showing a state where power is supplied from an AC power supply.

Next, the CPU 12 controls the power controller 25 to perform negotiation of restarting power supply with the digital camera 81 and the smart phone 82 (S25). The CPU 12 refers to the history information 43 in the NVRAM 15 and detects the amount of supplied power before power supply is stopped in S21. The CPU 12 controls the power controller 25 to perform negotiation of restarting power supply with the same amount of supplied power as that immediately before power supply is stopped in S21 (S25). In this negotiation of restarting power supply, the CPU 12 controls the power controller 25 to transmit, to the digital camera 81, information indicative of the same amount of power as the amount of power supplied to the digital camera 81 immediately before power supply is stopped in S21, as information on the suppliable amount of power. Further, in this negotiation of restarting power supply, the CPU 12 controls the power controller 25 to transmit, to the smart phone 82, information indicative of the same amount of power as the amount of power supplied to the smart phone 82 immediately before power supply is stopped in S21, as information on the suppliable amount of power. Upon receiving a response to notification of restarting power supply from the digital camera 81, the power controller 25 restarts 5 W power supply (S27). As shown in FIG. 8, for example, the amount of power supplied to the digital camera 81 changes from 5 W to 2.5 W and to 5 W. Similarly, upon receiving a response to notification of restarting power supply from the smart phone 82, the power controller 25 restarts 20 W power supply (S27).

The CPU 12 controls the power controller 25 and the power supply unit 27 to restart power supply to the digital camera 81 and the smart phone 82 while covering shortage of the power W1 by using the AC power supply and the battery 75 (S27). Thus, in response to determining that the amount of supplied power can be maintained before and after the power role switch (S17: YES), the CPU 12 of the present embodiment temporarily stops power supply and then performs control of restarting based on the history information 43. With this operation, even if voltage fluctuations and so on occur due to switch of the power supply from the PC 83 to the AC power supply and so on, transmission of that influence to the power sink can be suppressed. After executing S27, the CPU 12 again executes the processing from S11. While monitoring the connection state of external apparatuses (S11), the CPU 12 again executes the processing of updating the history information 43 (S13).

Alternatively, the CPU 12 may not temporarily stop power supply. For example, the CPU 12 may change the power supply from the PC 83 to the AC power supply and so on, while maintaining the amount of power supplied to the digital camera 81 and the smart phone 82. This embodiment will be described later while referring to FIG. 10.

In the restart of power supply in S19 and thereafter, in a case where excess power larger than the amount of power supplied to power sink is secured, the CPU 12 may supply power to another external apparatus. For example, the CPU 12 may supply the requested amount of power to the PC 83 that has become power sink. For example, in a case where it is detected from the history information 43 that there is a power sink for which power supply is stopped due to power shortage, the CPU 12 may supply the excess power to the power sink for which power supply is stopped. With this operation, when excess power is generated due to power role switch, the excess power can be utilized efficiently.

Figure 9:
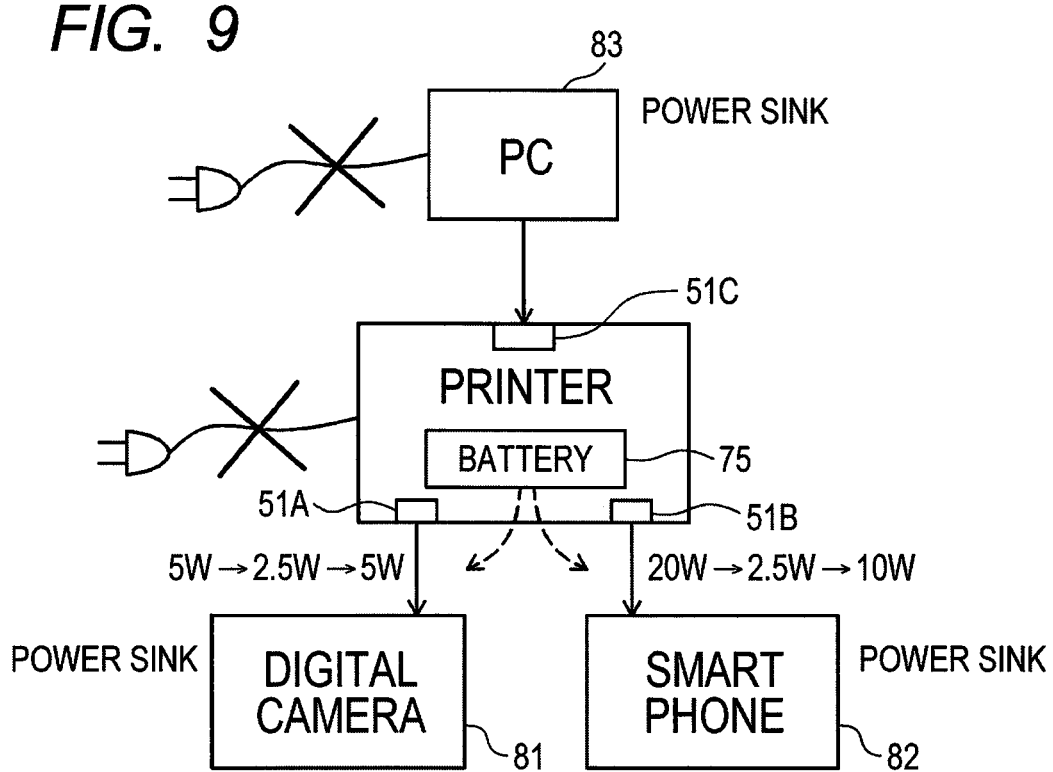
FIG. 9 is a diagram showing a state where power is supplied from a battery.

In response to determining in S17 that the suppliable power W2 is smaller than the supply power W3 (S17: NO), the CPU 12 executes the processing in S29 and thereafter. For example, as shown in FIG. 9, in a case where the printer 1 is disconnected from the AC power supply, power shortage occurs depending on the remaining amount of the battery 75. For example, in a case where the remaining amount of the battery 75 is lower than or equal to a particular level, in S17 the CPU 12 determines that the suppliable power W2 is smaller than the supply power W3. In this case, because the power W1 cannot be covered by other power supply, the CPU 12 performs control of reducing the amount of power supplied to the digital camera 81 and the smart phone 82, for example.

In S29, in a similar manner to S19, the CPU 12 controls the power controller 25 to transmit a response of accepting the swap request to the PC 83 from which the swap request is received. The PC 83 switches the power role from power source to power sink. The printer 1 switches the power role of the receptacle 51C from power sink to power source.

Next, in S31, in a similar manner to S21, the CPU 12 stops power supply to the digital camera 81 and the smart phone 82 of power sink. For example, the CPU 12 controls the power controller 25 and the power supply unit 27 to supply the minimum suppliable amount of power to the digital camera 81 and the smart phone 82 (S33).

Next, the CPU 12 controls the power controller 25 to perform negotiation of reducing the amount of supplied power with the power sink (S35). In this negotiation of reducing the amount of supplied power, the CPU 12 controls the power controller 25 to transmit, to the power sink, information indicative of a smaller amount of power than the amount of power that is supplied immediately before power supply is stopped in S31, as information relating to the suppliable amount of power. The method of reducing the amount of supplied power in S35 is not limited in particular. For example, the CPU 12 may give priority to a power sink for which power supply is started earlier, among the connected power sinks. In this case, the CPU 12 selects the external apparatus having the earliest (oldest) date and time from "date and time of start of power supply" of the history information 43. In the example shown in FIG. 5, the digital camera 81 of the vendor ID "0001" is the external apparatus having the earliest (oldest) date and time. In S35, the CPU 12 performs negotiation with the smart phone 82 and notifies the smart phone 82 that the amount of supplied power is to be reduced. Upon receiving a response of acceptance from the smart phone 82, the CPU 12 performs power supply by reducing the amount of power supplied to the smart phone 82 while maintaining the amount of power supplied to the digital camera 81 (S37). The amount of reducing supplied power may be changed depending on the result of negotiation. For example, as shown in FIG. 9, the CPU 12 reduces the amount of power supplied to the smart phone 82 from 20 W to 10 W. In this way, the CPU 12 of the present embodiment appropriately reduces the amount of power supplied to power sink, based on the history information 43.

Alternatively, the CPU 12 may reduce the amount of power supplied to the smart phone 82 of low priority to zero, that is, may stop power supply to the smart phone 82. By stopping power supply to the power sink in this way, the amount of power supplied to the other power sink can be secured. The method of reducing the amount of supplied power is not limited to the above-described method of giving priority to the power sink that is connected earlier. For example, the CPU 12 may give priority to the power sink that is not connected to an AC power supply or the power sink that does not have a battery, when supplying power. It is highly likely that the power sink that does not have an AC power supply or a battery operates by using only the power supplied from the printer 1. Hence, power may be supplied to the power sink that does not have such power supply with high priority. For example, the CPU 12 may acquire information on power supply of external apparatuses (whether it is connected to an AC power supply, whether it has a battery, and so on) from the external apparatuses through communication of USB PD, and store the information as the history information 43. And, in the processing of S35, the CPU 12 may determine the priority of power sinks by using the power supply information in the history information 43.

Alternatively, in conjunction with the processing of reducing supplied power, the CPU 12 may give notification of power shortage as an error. For example, the CPU 12 may display an error screen on the user interface 20. Further, the CPU 12 may display only an error on the user interface 20 without reducing the supplied power.

The printer 1 is an example of an information processing apparatus. The CPU 12 is an example of a controller. The NVRAM 15 is an example of a memory. The PC 83 is an example of a first external apparatus. The receptacle 51C is an example of a first interface. The digital camera 81 and the smart phone 82 are examples of a second external apparatus. The receptacles 51A, 51B are examples of a second interface. Step S13 is an example of a storing step. Step S15 is an example of a first determination step. Steps S27, S37 are examples of a power delivery step.

<4. Advantageous Effects>

According to the above-described embodiment, the following effects are obtained.

(1) The CPU 12 of the printer 1 in the present embodiment performs: processing in S13 (an example of storing processing) of storing, in the NVRAM 15, history information 43 relating to power delivery with the digital camera 81 and so on through the receptacles 51A, 51B, the history information 43 including the vendor ID and the product ID (an example of identification information) of the digital camera 81 and the amount of supplied power (an example of the amount of power delivery); processing in S15 (an example of first determination processing) of determining whether the power role switch with the PC 83 is to be performed; and processing in S27, S37 (an example of power delivery processing) of, in response to determining in S15 that the power role switch is to be performed (S15: YES), performing power delivery with the digital camera 81 and the smart phone 82 through the receptacles 51A, 51B based on the history information 43.

With this operation, until performing power role switch with the PC 83 (S15: NO), the CPU 12 stores, in the NVRAM 15, the history information 43 of the digital camera 81 and the smart phone 82. In response to determining that the power role switch is to be performed (S15: YES), the CPU 12 performs power delivery with the digital camera 81 and so on based on the history information 43. By referring to the amount of supplied power in the history information 43, power supply after switch can be appropriately performed for the digital camera 81 and so on, with which no power role switch is performed.

(2) In response to receiving a request for power role switch from the PC 83 (S15: YES), in the processing in S15 the CPU 12 determines that power role switch is to be performed. With this operation, on condition that the request for power role switch is received from the PC 83, the CPU 12 performs power delivery with the digital camera 81 and so on based on the history information 43.

(3) In response to determining in S15 that power role switch is to be performed (S15: YES), the CPU 12 executes switching processing of switching the power role of the printer 1 itself from power sink to power source (S19, S29). There is a possibility that power shortage occurs in the printer 1 because the power role of the printer 1 itself is switched from power sink to power source. In such case, the CPU 12 appropriately performs power delivery after switch for the digital camera 81 and so on, based on the history information 43.

(4) In a case where the amount of supplied power of the history information 43 includes the amount of power supplied to the digital camera 81 and so on, the CPU 12 executes determination processing in S17 (an example of second determination processing) of determining whether power supply can be performed again for the digital camera 81 and so on, with the amount of power supplied to the digital camera 81 and so on included in the history information 43, after completing power role switch. With this operation, in a case where power has been supplied to the digital camera 81 and so on, the CPU 12 determines whether the amount of supplied power can be maintained after the power role switch. Thus, power supply can be performed appropriately depending on the determination result of whether the amount of supplied power can be maintained.

(5) In response to determining in S17 that power can be supplied again to the digital camera 81 and so on, the CPU 12 notifies the digital camera 81 and so on that power is supplied with the same amount of power supplied to the digital camera 81 and so on included in the history information 43 (S25). With this operation, in response to determining that the amount of supplied power can be maintained after power role switch, the CPU 12 notifies the digital camera 81 and so on that power is supplied with the same amount of supplied power before switch. Thus, by performing notification before restarting power supply, negotiation can be performed with the digital camera 81 and so on, to restart appropriate power delivery.

Figure 10:
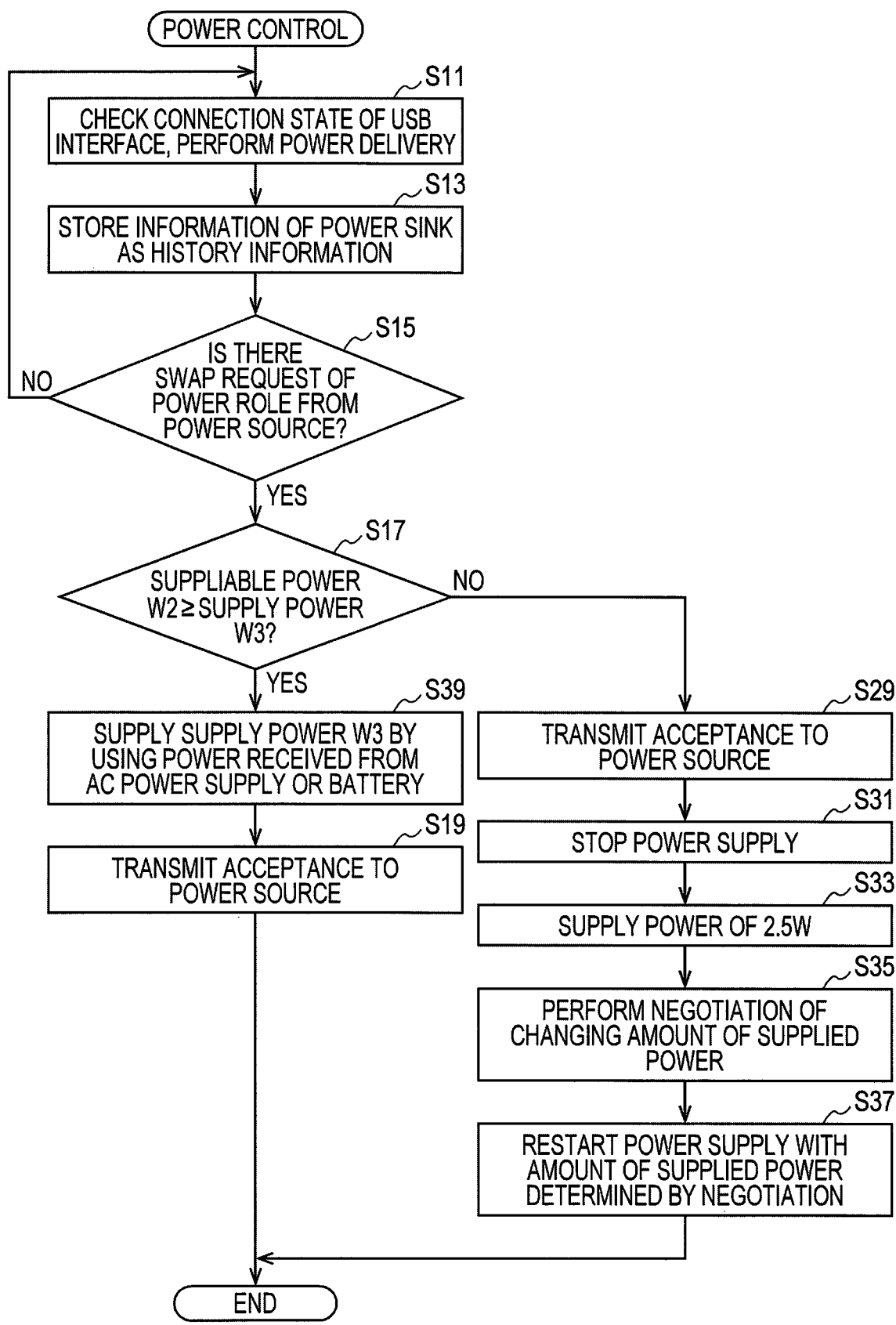
FIG. 10 is a flowchart showing the steps of power control according to another example.

(6) In response to determining in S17 that power can be supplied again to the digital camera 81 and so on, the CPU 12 may continue power supply to the digital camera 81 and so on with the amount of power supplied to the digital camera 81 and so on included in the history information 43 (S27, FIG. 10). With this operation, in response to determining that the amount of supplied power can be maintained after power role switch, the CPU 12 continues power supply while maintaining the amount of supplied power, without performing notification to the digital camera 81 and so on. This suppresses an influence due to power role switch acting on the digital camera 81 and so on to a minimum extent.

(7) In response to determining in S17 that power cannot be supplied again to the digital camera 81 and so on, the CPU 12 notifies the digital camera 81 and so on that a smaller amount of power is supplied than the amount of power supplied to the digital camera 81 and so on included in the history information 43 (S35). That is, in response to determining that the amount of supplied power cannot be maintained after power role switch (S17: NO), the CPU 12 notifies the digital camera 81 and so on that the amount of supplied power is reduced. And, negotiation of reducing the amount of supplied power is started with the digital camera 81 and so on, and the amount of power that runs short due to power role switch can be secured.

(8) In response to determining in S17 that power cannot be supplied again to the digital camera 81 and so on, the CPU 12 may notify the digital camera 81 and so on that power is not supplied. That is, in response to determining that the amount of supplied power cannot be maintained after power role switch (S17: NO), the CPU 12 notifies the digital camera 81 and so on that power supply is stopped. Thus, power supply to the digital camera 81 and so on is stopped, and the amount of power that runs short due to power role switch can be secured.

(9) When power role switch is performed with the PC 83, the CPU 12 stops power delivery with the digital camera 81 and so on through the receptacles 51A, 51B (S21, S31). That is, when power role switch is performed, the CPU 12 temporarily stops power delivery with the digital camera 81 and so on. In the case of the communication standard in which such control need to be performed, it is necessary to restart power delivery with the digital camera 81 and so on that is temporarily stopped. In this case, the CPU 12 appropriately restarts power delivery with the digital camera 81 and so on, based on the history information 43.

(10) When power role switch is performed with the PC 83, the CPU 12 temporarily changes the amount of power that is supplied to the digital camera 81 and so on through the receptacles 51A, 51B to 2.5 W (an example of a particular amount of power) (S23, S33). That is, when power role switch is performed, the CPU 12 temporarily changes the amount of power supplied to the digital camera 81 and so on, to a minimum power of 2.5 W. With this operation, in a state where the supplied power is changed to 2.5 W, the CPU 12 appropriately sets the amount of power delivery with the digital camera 81 and so on.

(11) The receptacles 51A to 51C are interfaces that perform power delivery and communication by connection compatible with the USB (Universal Serial Bus) standard. In the printer 1 including interfaces that can perform power delivery compatible with the USB PD standard and so on, it is highly likely that the amount of power delivery fluctuates due to power role switch. Hence, in the printer 1 including interfaces of the USB standard, it is extremely effective to perform power delivery based on the history information 43 in conjunction with power role switch.

<5. Modification>

While the disclosure has been described in detail with reference to the above aspects thereof, it would be apparent to those skilled in the art that various changes and modifications may be made therein without departing from the scope of the claims.

For example, in the above-described embodiment, in response to determining in S17 that the amount of supplied power can be maintained (S17: YES), after temporarily stopping power supply (S21, S23), the CPU 12 performs control of restarting power supply based on the history information 43 (S25, S27). However, the CPU 12 does not necessarily need to temporarily stop power supply.

Power control according to a modification will be described while referring to FIG. 10, wherein like parts and components similar to those in FIG. 4 in the above-described embodiment are designated by the same reference numerals to avoid duplicating description. In the modification shown in FIG. 10, the CPU 12 does not execute the processing of S21, S23, and S25 shown in FIG. 4. As shown in FIG. 10, in response to determining in S17 that the suppliable power W2 is larger than or equal to the supply power W3 (S17: YES), the CPU 12 supplies the supply power W3 to the digital camera 81 and the smart phone 82 while receiving the shortage amount of the power W1 from the AC power supply or the battery 75 (S39). For example, while maintaining the amount of power supplied to the digital camera 81 and the smart phone 82 (5 W, 20 W in the example shown in FIGS. 7 and 8), the CPU 12 switches the FET 77 and so on to change the power supply from the PC 83 to the AC power supply and so on (S39). The CPU 12 transmits a response of accepting the swap request to the PC 83 (S19). In this modification, the digital camera 81 and the smart phone 82 maintain a state of receiving a constant amount of supplied power before and after power role switch. Thus, it is unnecessary to reduce the amount of supplied power due to power role switch, and this suppresses an influence due to power role switch acting on the digital camera 81 and so on to a minimum extent. Further, the digital camera 81 and the smart phone 82 of power sink do not need to perform negotiation with the printer 1, and keep receiving the constant amount of supplied power.

Figure 11:
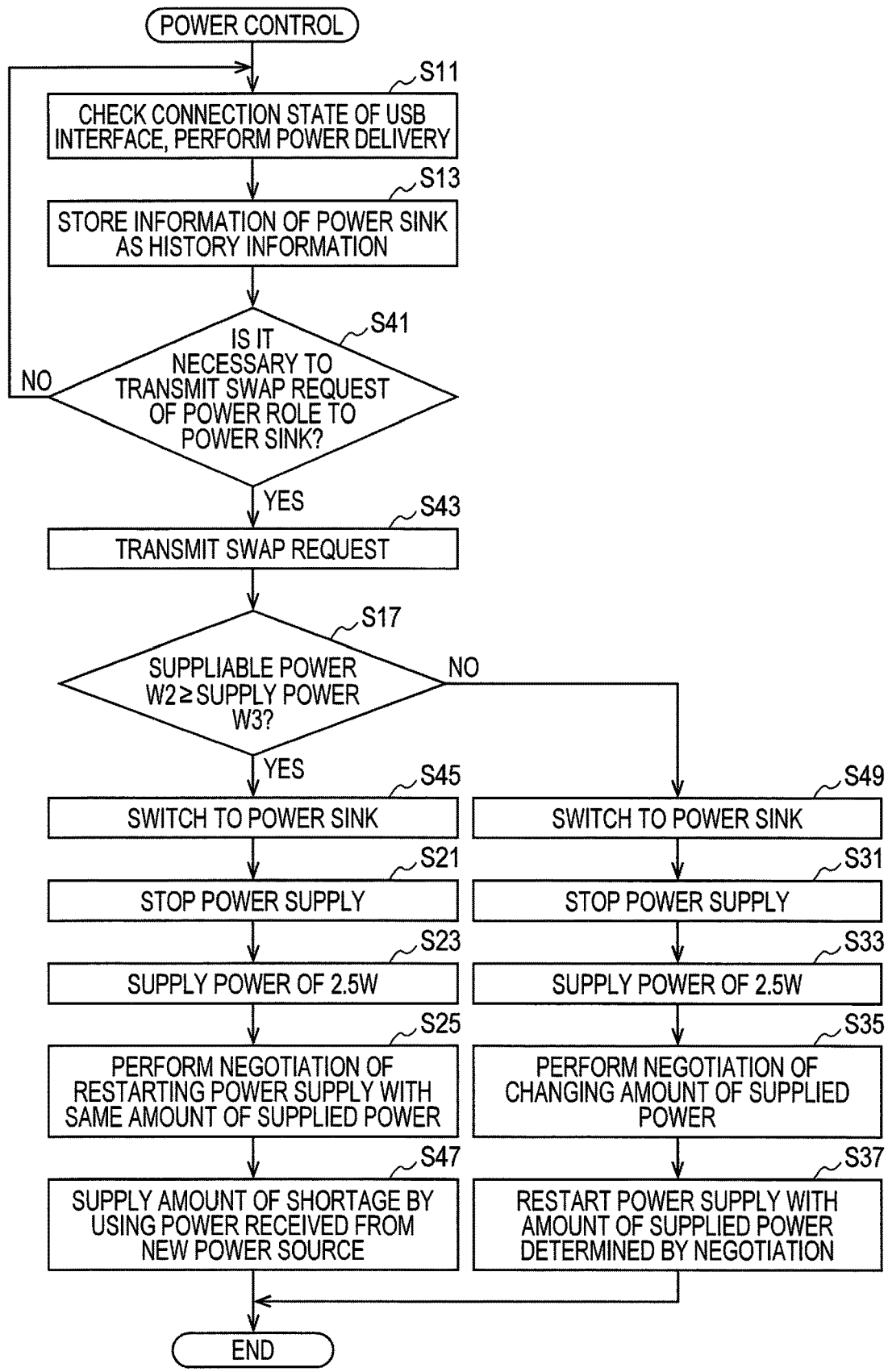
FIG. 11 is a flowchart showing the steps of power control according to still another example.

In the above-described embodiment, in response to receiving a swap request from power source, the CPU 12 performs determination of the suppliable power W2 and so on. However, the processing is not limited to this. FIG. 11 shows a flowchart of power control according to a modification. In the example shown in FIG. 11, in response to switching the power role of the printer 1 itself from power source to power sink, the CPU 12 performs determination processing of the suppliable power W2 and so on.

Figure 4:
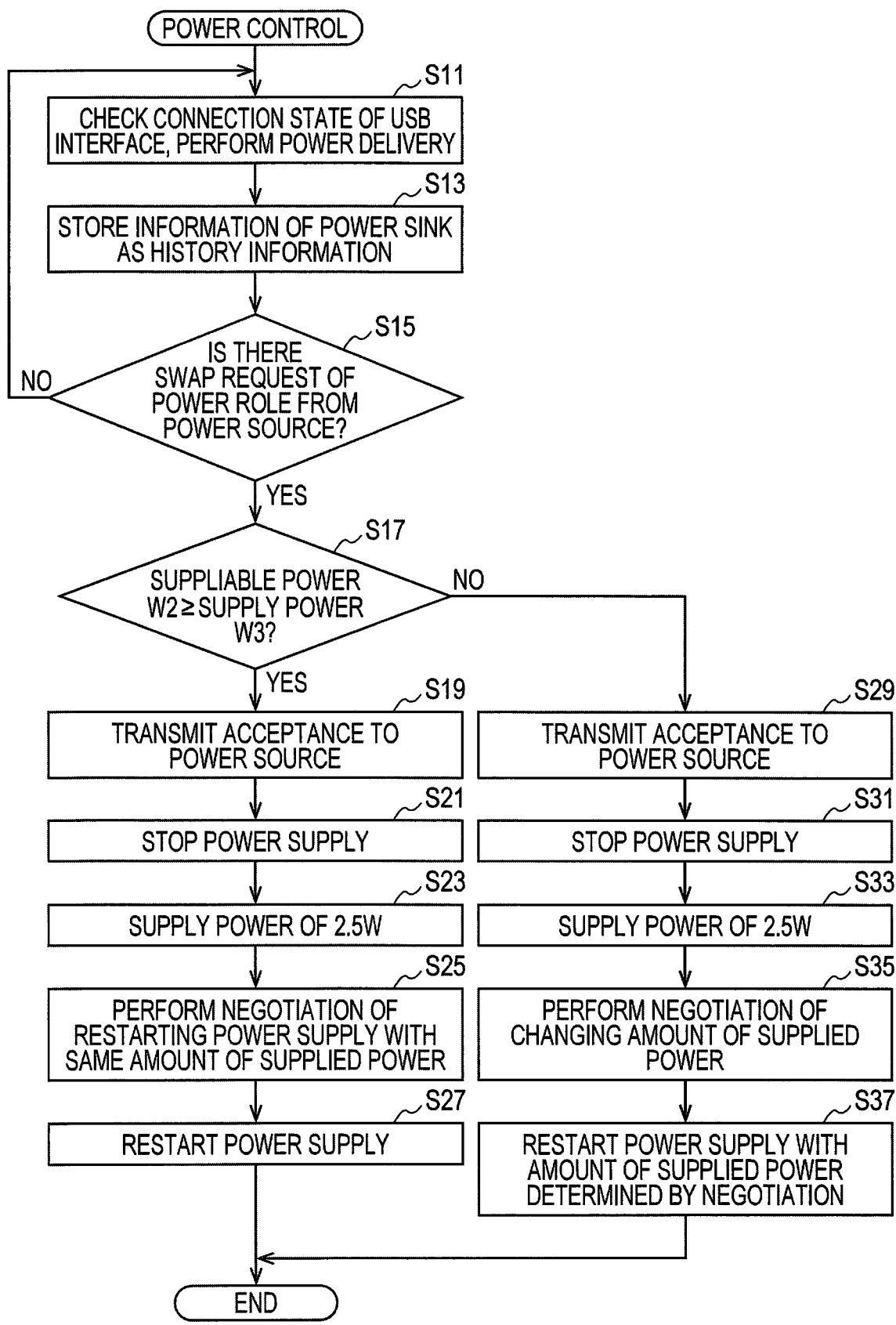
FIG. 4 is a flowchart showing the steps of power control.
Figure 12:
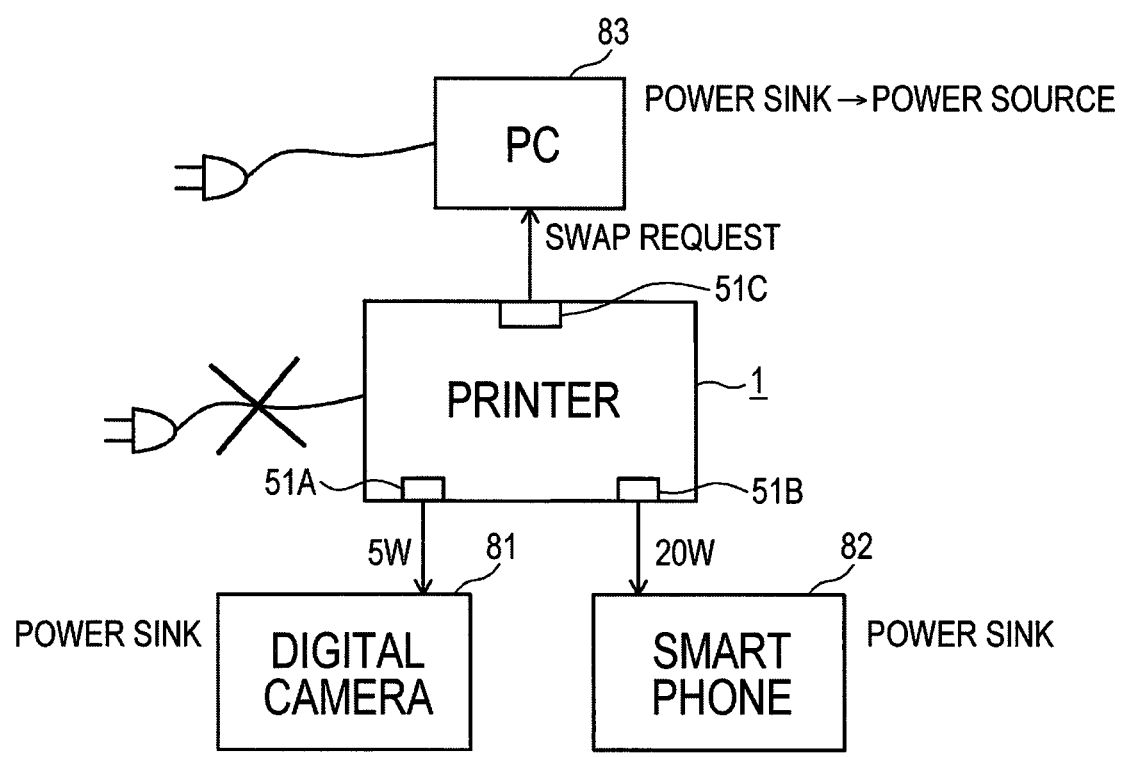
FIG. 12 is a diagram showing the configuration of USB connection of the printer.

The CPU 12 executes S41 after executing S11, S13 in a similar manner to FIG. 4. In S41, the CPU 12 determines whether it is necessary to transmit a swap request to power sink. FIG. 12 shows a connection configuration of the printer 1 according to the modification. For example, the printer 1 functions as power source for the PC 83 as well as the digital camera 81 and the smart phone 82. In this state, the printer 1 is disconnected from the AC power supply. By being disconnected from the AC power supply, the printer 1 becomes a state of power shortage. Thus, in response to detecting disconnection from the AC power supply, the CPU 12 determines in S41 whether a swap request is to be transmitted to the PC 83 of power sink.

In response to determining in S41 that a swap request is to be transmitted to the PC 83 (S41: YES), the CPU 12 transmits a swap request to the PC 83 (S43). Next, the CPU 12 executes S17. In a case where the printer 1 is disconnected from the AC power supply, the printer 1 becomes short of power by the amount of power that has been received from the AC power supply. On the other hand, in a case where the printer 1 is successful in power role switch in the swap request in S43, the printer 1 can receive power from the PC 83. In S17, the CPU 12 determines the amount of power receivable from the PC 83 as the suppliable power W2. Thus, by comparing the suppliable power W2 with the supply power W3 in S17, the CPU 12 determines whether the amount of power that runs short due to disconnection from the AC power supply can be compensated (covered) by the power from the PC 83, for example.

In a case where a notification of accepting the swap request is received from the PC 83 and power of the amount of shortage is supplied from the PC 83, in S17 the CPU 12 determines that the suppliable power W2 is larger than or equal to the supply power W3 (S17: YES). The CPU 12 performs power role switch with the PC 83, and becomes power sink (S45). In a similar manner to FIG. 4, the CPU 12 executes S21, S23, and S25 relative to the digital camera 81 and the smart phone 82 of power sink. In S47, by using the power received from the PC 83 of new power source, the CPU 12 restarts power supply to the digital camera 81 and the smart phone 82. In this way, even in a case where the printer 1 switches from power source to power sink due to power shortage, the printer 1 receives power from a new power source and maintains the amount of power supplied to power sink.

In response to determining in S17 that power of the amount of shortage cannot be received from the PC 83, the CPU 12 determines that the suppliable power W2 is smaller than the supply power W3 (S17: NO). For example, in a case where only the minimum amount of power 2.5 W can be received from the PC 83, the CPU 12 determines that the suppliable power W2 is smaller than the supply power W3 (S17: NO). The CPU 12 performs power role switch with the PC 83, and becomes power sink (S49). In a similar manner to FIG. 4, the CPU 12 executes S31, S33, S35, and S37 relative to the digital camera 81 and the smart phone 82 of power sink. For example, in S35, in order to secure power of the amount of shortage, the CPU 12 performs control of reducing the amount of power supplied to the smart phone 82 and so on. With this operation, in a case where the printer 1 switches from power source to power sink due to power shortage and new power cannot be secured, the amount of supplied power can be appropriately reduced based on the history information 43. In this way, even in a case where a swap request is transmitted, the CPU 12 appropriately performs power delivery after power role switch, based on the history information 43.

In the above-described embodiment, the CPU 12 performs the power control shown in FIG. 4. Alternatively, another apparatus may perform the power control shown in FIG. 4. For example, the power controller 25 may perform the power control shown in FIG. 4, by executing the program PG in the memory 26. In this case, the power controller 25 is an example of a controller of this disclosure. The program PG is an example of a program of this disclosure.

A memory storing the history information 43 need not be necessarily provided within the printer 1. For example, the CPU 12 may store the history information 43 in an external apparatus such as a server.

The CPU 12 need not necessarily perform the determination processing in S17 (an example of second determination processing). For example, in a case where a positive determination is made in S15, the CPU 12 may reduce the amount of power supplied to the digital camera 81 and so on, by a certain amount, based on the history information 43.

In a case where a positive determination is made in the determination processing in S17, the CPU 12 may supply the amount of power that is smaller than the amount of power supplied to the digital camera 81 and so on stored in the history information 43.

The communication standard of the first and second interfaces in this disclosure is not limited to the USB PD standard, and may be another communication standard by which power delivery can be performed.

In the above-described embodiment, the CPU 12 is adopted as the controller of this disclosure. However, the controller of this disclosure is not limited to the CPU 12. For example, at least part of the controller may be formed by a dedicated hardware such as an ASIC (Application Specific Integrated Circuit). The controller may be configured to operate by combination of processing by software and processing by hardware, for example.

In the above-described embodiment, the portable printer 1 is adopted as the information processing apparatus of this disclosure. However, the information processing apparatus of this disclosure is not limited to the portable printer 1. The information processing apparatus of this disclosure may be a stationary printer, instead of a portable printer. Further, the information processing apparatus of this disclosure may be a copier, a facsimile apparatus, a scanner apparatus, or a camera, instead of a printer. Further, the information processing apparatus of this disclosure may be a multifunction peripheral (MFP) having a plurality of functions.

What is claimed is:

1. An information processing apparatus comprising:
a first interface configured to perform power delivery and communication with a first external apparatus;
a second interface configured to perform power delivery and communication with a second external apparatus; and
a controller configured to perform:
storing, in a memory, history information relating to power delivery performed with the second external apparatus through the second interface, the history information including identification information of the second external apparatus and an amount of power delivery with the second external apparatus;
determining whether to perform a power role switch with the first external apparatus, the power role switch being a switch of a power role between a power source of supplying power and a power sink of receiving power; and
in response to determining that the power role switch is to be performed, performing power delivery with the second external apparatus through the second interface based on the history information stored in the memory.

2. The information processing apparatus according to claim 1, wherein the controller is configured to, in response to receiving a request for the power role switch from the first external apparatus, determine that the power role switch is to be performed.

3. The information processing apparatus according to claim 1, wherein the controller is configured to, in response to determining that the power role switch is to be performed, switch a power role of the information processing apparatus relative to the first external apparatus from the power sink to the power source.

4. The information processing apparatus according to claim 1, wherein the controller is configured to, in a case where the amount of power delivery in the history information includes an amount of power supplied to the second external apparatus, determine whether a first amount of power can be supplied to the second external apparatus again after completing the power role switch, the first amount of power being the amount of power supplied to the second external apparatus included in the history information.

5. The information processing apparatus according to claim 4, wherein the controller is configured to, in response to determining that the first amount of power can be supplied to the second external apparatus again, notify the second external apparatus that the first amount of power is supplied to the second external apparatus.

6. The information processing apparatus according to claim 4, wherein the controller is configured to, in response to determining that the first amount of power can be supplied to the second external apparatus again, continue supplying the first amount of power to the second external apparatus.

7. The information processing apparatus according to claim 4, wherein the controller is configured to, in response to determining that the first amount of power cannot be supplied to the second external apparatus again, notify the second external apparatus that a second amount of power is supplied to the second external apparatus, the second amount of power being smaller than the amount of power supplied to the second external apparatus included in the history information.

8. The information processing apparatus according to claim 4, wherein the controller is configured to, in response to determining that the first amount of power cannot be supplied to the second external apparatus again, notify the second external apparatus that no power is supplied to the second external apparatus.

9. The information processing apparatus according to claim 1, wherein the controller is configured to, in a case where the power role switch is performed with the first external apparatus, stop power delivery performed with the second external apparatus through the second interface.

10. The information processing apparatus according to claim 1, wherein the controller is configured to, in a case where the power role switch is performed with the first external apparatus, temporarily change an amount of power supplied to the second external apparatus into a particular amount of power.

11. The information processing apparatus according to claim 1, wherein each of the first interface and the second interface is configured to perform power delivery and communication through connection compatible with a USB (Universal Serial Bus) standard.

12. The information processing apparatus according to claim 1, wherein the controller is configured to, in response to determining that the power role switch is to be performed, transmit a request for the power role switch to the first external apparatus, and switch a power role of the information processing apparatus relative to the first external apparatus from the power source to the power sink.

13. A method of controlling an information processing apparatus including a first interface configured to perform power delivery and communication with a first external apparatus and a second interface configured to perform power delivery and communication with a second external apparatus, the method comprising:
   storing, in a memory, history information relating to power delivery performed with the second external apparatus through the second interface, the history information including identification information of the second external apparatus and an amount of power delivery with the second external apparatus;
   determining whether to perform a power role switch with the first external apparatus, the power role switch being a switch of a power role between a power source of supplying power and a power sink of receiving power; and
   in response to determining that the power role switch is to be performed, performing power delivery with the second external apparatus through the second interface based on the history information stored in the memory.

14. The method according to claim 13, further comprising:
   in response to receiving a request for the power role switch from the first external apparatus, determining that the power role switch is to be performed.

15. The method according to claim 13, further comprising:
   in response to determining that the power role switch is to be performed, switching a power role of the information processing apparatus relative to the first external apparatus from the power sink to the power source.

16. The method according to claim 13, further comprising:
   in a case where the amount of power delivery in the history information includes an amount of power supplied to the second external apparatus, determining whether a first amount of power can be supplied to the second external apparatus again after completing the power role switch, the first amount of power being the amount of power supplied to the second external apparatus included in the history information.

17. A non-transitory computer-readable storage medium storing a set of program instructions for controlling an information processing apparatus including a controller, a first interface configured to perform power delivery and communication with a first external apparatus, and a second interface configured to perform power delivery and communication with a second external apparatus, the set of program instructions, when executed by the controller, causing the information processing apparatus to perform:
   storing, in a memory, history information relating to power delivery performed with the second external apparatus through the second interface, the history information including identification information of the second external apparatus and an amount of power delivery with the second external apparatus;
   determining whether to perform a power role switch with the first external apparatus, the power role switch being a switch of a power role between a power source of supplying power and a power sink of receiving power; and
   in response to determining that the power role switch is to be performed, performing power delivery with the second external apparatus through the second interface based on the history information stored in the memory.

18. The non-transitory computer-readable storage medium according to claim 17, wherein the set of program instructions, when executed by the controller, causes the information processing apparatus to perform:
   in response to receiving a request for the power role switch from the first external apparatus, determining that the power role switch is to be performed.

19. The non-transitory computer-readable storage medium according to claim 17, wherein the set of program instructions, when executed by the controller, causes the information processing apparatus to perform:
   in response to determining that the power role switch is to be performed, switching a power role of the information processing apparatus relative to the first external apparatus from the power sink to the power source.

20. The non-transitory computer-readable storage medium according to claim 17, wherein the set of program instructions, when executed by the controller, causes the information processing apparatus to perform:
   in a case where the amount of power delivery in the history information includes an amount of power supplied to the second external apparatus, determining whether a first amount of power can be supplied to the second external apparatus again after completing the power role switch, the first amount of power being the amount of power supplied to the second external apparatus included in the history information.

* * * * *